Dec. 4, 1951 B. M. HADFIELD 2,577,578

TRIGGERING IN ELECTRONIC SWITCHING DEVICES

Filed Aug. 1, 1946 2 SHEETS—SHEET 1

INVENTOR
BERTRAM MORTON HADFIELD

BY Chas. W. Candy

ATTORNEY

TRIGGERING IN ELECTRONIC SWITCHING DEVICES

Filed Aug. 1, 1946 2 SHEETS—SHEET 2

INVENTOR
BERTRAM MORTON HADFIELD

BY Chas. Wm. Candy

ATTORNEY

Patented Dec. 4, 1951 2,577,578

UNITED STATES PATENT OFFICE 2,577,578

TRIGGERING IN ELECTRONIC SWITCHING DEVICES

Bertram Morton Hadfield, Harrow Weald, England, assignor to Automatic Electric Laboratories Inc., Chicago, Ill., a corporation of Delaware Application August 1, 1946, Serial No. 687,637
In Great Britain August 3, 1945

13 Claims. (Cl. 250—27)

The present invention relates to circuit arrangements including an electron discharge device having a cathode and at least four additional electrodes and one of the objects of the invention is to provide a circuit arrangement having an operational region where the current changes in the circuits associated with two of the electrodes are inverse.

A further object of the invention is to provide means whereby the action is cumulative for a given input while with decreasing input the reverse cumulative action may occur at inputs lower than the forward action by calculable amounts from zero upwards. It is also an object of the invention to provide such circuits for the above effects as will give design and operation substantially independent of the curvilinear characteristics of the electron discharge device, and whose ultimate performance in terms of output current and voltage is limited only by the normal values for the device. The circuits of the invention therefore have operational currents and voltages which are linear functions of the applied input voltage and supply voltage, and are thus easily calculable for any specific purpose and not subject to change with life or other effects influencing the normal characteristics of the electron discharge device.

Finally it is an object of the invention to provide a new and improved form of switching device suitable for use as an automatic switch in telephone or like systems.

According to the invention, a resistance is included in the cathode lead of the discharge device and the steady voltages applied to the remaining electrodes are such that the operational range of the circuit includes a region where the current changes in the circuit associated with two of the electrodes are inverse.

The electron discharge device may consist of a pentode valve, the operating point within the operational range being determined by the suppressor-cathode voltage, or it may consist of a beam-deflection valve having a plurality of anodes, means being provided for causing the deflection of the electron beam from one anode to the next in response to a change in anode voltage.

The cumulative action is obtained by the provision of a feedback circuit connected, in circuits using a pentode valve, between the anode or screen grid and the control or suppressor grid. Preferably the feedback circuit comprises a potentiometer and the value of the portion of the potentiometer over which the feedback voltage is developed is selected so that the cumulative action takes place with or without backlash.

According to a feature of the invention an automatic switch for use in telephone or like systems comprises a beam-deflection valve having a plurality of anodes arranged in one or more rows and a feedback circuit from the anodes for controlling deflection means for the electron beam whereby in response to a change in anode voltage the electron beam is deflected from one anode to the next.

In one arrangement a series of impulses are applied to the control grid of the beam-deflection valve to cause successive changes in anode potential whereby the electron beam is deflected successively from anode to anode, while in another arrangement a hunting operation is obtained by causing the deflection of the electron beam to be initiated by the application of an impulse to the control grid while the subsequent successive deflection of the electron beam from anode to anode is effected by providing instantaneous feedback and delayed feedback to the deflection electrode.

The invention will be better understood from the following description of a number of embodiments taken in conjunction with the accompanying drawings comprising Figs. 1 to 10 inclusive in which.

Figure 1:
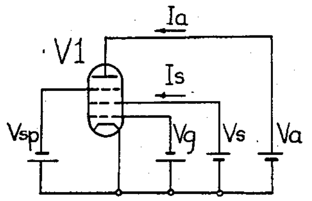
Figs. 1 and 2 are explanatory only.

In Fig. 1 is shown a pentode valve V1 with various appropriate voltages connected between the cathode and the remaining electrodes. The control grid voltage is shown as negative $Vg$, the screen grid voltage as positive $Vs$ producing a current $Is$, the suppressor grid voltage as negative $Vsp$, and the anode voltage as $Va$ producing a current $Ia$. The cathode current $Ic$ is the sum of $Ia$ and $Is$, and is dependent only on $Vg$ and $Vs$, since variations of $Va$ have substantially no effect when $Vsp$ is around zero (i. e. the normal method of working the valve). The distribution of $Ic$ between $Is$ and $Ia$ may, however, be altered without alteration to $Ic$, by varying $Vsp$. If $Vsp$ is made sufficiently large and negative, then $Ia$ is zero and $Is$ equals $Ic$. As $Vsp$ is made less negative i. e. more positive, the anode current commences to increase, slowly at first, then with a maximum of slope, and then the slope decreases again until the anode current settles down at its normal fraction $k.Ic$. Meantime the screen current having started at Ic is similarly reduced to $(1-k)Ic$, since the sum of Ia and Is remains constant. This process is shown graphically in Fig. 2, where the dotted curves approximate to the experimental evidence.

Figure 2:
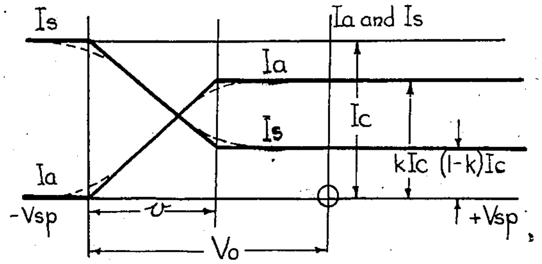

Idealising these curves into the full lines shown in Fig. 2, it is found that for a given class of valve the voltage difference $v$ over which the current changes occur, remains sensibly constant despite large variations in the absolute magnitudes of the electrode potentials. For instance, variation of the fixed values of Va and Vs between 50 and 300 volts and with any possible combination (i. e. high Va, low Vs, and vice versa), only changes $v$ from 12 to 19 volts, although the current magnitudes were correspondingly wide. In fact, it is possible that the reason why $v$ is not absolutely constant, lies in the fact that the control exerted by the suppressor grid varies slightly with electron density. It is also found that the voltage Vo at which Ia commences to flow (ideally), varies proportionately to the sum of Vs and Va; strictly Vo equals $Vs/us+Va/ua$ where $us$ and $ua$ are different but of the same order. For convenience we shall assume $$Vo=\frac{Va+Vs}{\mu}$$

where $\mu$ is a constant. Generally speaking Vo is a negative voltage with respect to the cathode, and $\mu$ is around 10 with pentodes of the "high frequency" type. With this information it is now possible to apply the invention and to calculate the operation.

Figure 3:
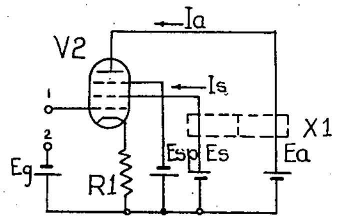
Figs. 3 to 10 show different trigger circuits embodying the invention.

Fig. 3 shows the first form of the invention, with a theoretical diagram. The pentode valve V2 now has a cathode resistance R1 and the various applied electrode voltages are now denoted by Eg, Es, Esp, and Ea. If Esp be chosen so that with a very small cathode current the net suppressor-cathode voltage is less than $Vo-v$ (Fig. 2), then as Eg is made less negative by means of a voltage applied between terminals 1 and 2, the cathode, screen and anode currents rise normally until the negative suppressor-cathode voltage equals $Vo-v$. For values of Eg less negative than this particular value, Ia will tend to decrease ultimately reaching zero, while Is will rise more rapidly until it attains the value Ic. The cathode current Ic has, of course, been consistently increasing in a normal manner. The change of Eg over which this action takes place, is substantially equal to $v$, so that by increasing the value of R1 at will, the changeover of electrode currents may be made to occur over a small fraction of Eg. The circuit therefore provides means of detecting any given value of input voltage i. e. Eg, particularly if the contrary senses of Ia and Is are utilised to control a polarised relay such as is shown in dotted lines at X1.

Figure 4:
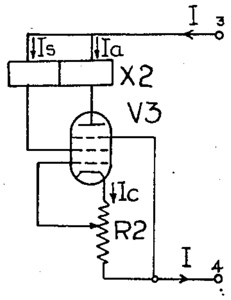

Fig. 4 shows another form of Fig. 3 in which the detection of a particular current is obtained without causing any alteration to the current. The pentode valve V2 with its cathode resistance R2 and a polarised relay X2 is arranged in series with the supply current I fed through terminals 3 and 4. The suppressor grid is taken to the return lead from R2 and the control grid to a tap on R2, the only effect of which is to cause the valve circuit to have a higher resistance as the tap is moved downwards. Assuming R2 is such that with I small the suppressor voltage is less than $Vo-v$, then as I is increased the suppressor voltage approaches $Vo-v$ and passes therethrough, thus causing Ia to fall to zero and Is to rise to I, without changing the valve circuit resistance to I. Hence changeover of relay X2 will indicate a specific current, and again the relative rapidity of indication may be increased by increasing the valve circuit resistance (e. g. by including more of R2 in the control grid circuit).

In both Figs. 3 and 4 the actions described are completely reversible without backlash, since the changes are essentially non-cumulative. The term backlash is used herein to describe the difference between the value of the controlling voltage at which the changeover takes place while increasing the value of the controlling voltage and the value of the controlling voltage at which the reverse changeover takes place while decreasing the value of the controlling voltage. It can be thought of as similar to a hysteresis effect. The remaining description will deal with the slight modifications to the circuits to make the changeover action cumulative.

Figure 5:
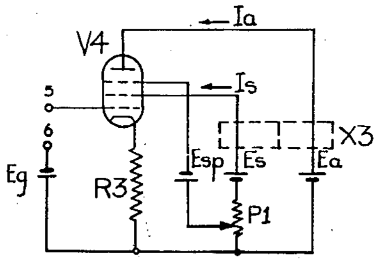

It will readily be seen from consideration of Fig. 3 that all that is necessary to cause the changeover to be cumulative, is that one or the other of the two modulating grids shall be fed with an additional voltage due to the current changes in Ia or Is, such that the effect is to accelerate the changes. Fig. 5 shows the same circuit as Fig. 3 but with the addition of a resistance P1 in the screen lead, a fraction $q$ of the voltage on which is also added to the suppressor voltage. Clearly when $q$ is zero, we have Fig. 3 modified only in that the valve current is reduced in a known manner by P1. As $q$ is increased, and assuming that Eg is such that the suppressor-cathode voltage is just $Vo-v$, then further increase in Eg will cause Is to increase, and an additional negative voltage due to $q.P$ times the rise in Is (where P is the value of P1) will be added to the suppressor-cathode voltage. The action of Fig. 3 is therefore accelerated, and it can be shown that when $q.P$ equals $Rs$, where Rs is the reciprocal of the slope of the full line Ia curve in Fig. 2 (i. e. $Rs=v/k.Ic$), the action is cumulative and an infinitesimal increase of Eg causes Ia to go from $k.Ic$ to zero while Is goes from $(1-k)Ic$ to $Ic$. This action is reversible without backlash for this critical value of $q.P$. If $q.P$ is made larger than Rs, then the reverse action by reducing Eg will have backlash, since the additional negative suppressor-cathode voltage introduced by the change $(1-k)Ic.q.P$ to $Ic.q.P$ on the forward action is larger than $v$, and in so far as it is larger than Eg will have to be reduced by substantially this amount before the reverse cumulative action occurs. Thus any desired degree of voltage backlash can be easily arranged for, and it is the more easily calculable ignoring the valve characteristics when R3 is made large, so that it can be assumed that $Ic.R$ equals $Eg$ (where R is the value of R3).

Figure 6:
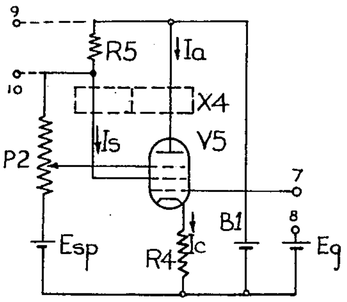

Fig. 6 shows a practical form of this circuit using only one supply battery B1. The fraction $q$ of the change of screen voltage on R5 is taken by means of a high impedance potentiometer P2, while the priming suppressor and control grid voltages are shown as Esp and Eg. It is easily arranged that the circuit can be so direct coupled and operated in the manner described, by assigning proper values to Esp and Eg, that, provided R4 is made much larger than the mutual grid resistance of the valve (including the effects of R5 and P2), the calculations can be based on the characteristics of the valve shown in Fig. 2 and the fact that *Ic.R* equals *Eg*, where R is the value of R4. This in turn means, of course, that reasonable deterioration in the mutual resistance of the valve with sample or life, will not affect the performance of the circuit. Use may be made of the trigger action of the circuit, by means of a polarised relay such as X4 as shown in Fig. 6 or by voltages taken from the resistance R5 to terminals 9 and 10 as shown by the dotted connections in Fig. 6.

It should also be noted that, while in Figs. 3, 5 and 6, the trigger action is initiated by E*g*, it can also be initiated by a voltage change on E*sp*, and that the sense of such action is opposite, i. e. increase of E*sp* causes anode current to flow, while increase of E*g* causes anode current to cease. The voltage increment necessary on E*sp* will, however, be more than that required by E*g*, owing to the potentiometer, and will be in the ratio of $1:(1-q)$.

The form of the invention shown in Fig. 6, while practicable, suffers from two disadvantages. The first is that the calculation of the circuit parameters for a specific case is rendered more difficult by the fact that until a value for the resistance R5 and potentiometer P2 is ascertained the value for R4 is unknown, since R5 and P2 in effect degrade the mutual resistance of the valve. The second is that the control grid operation (which is the only electrode available drawing no current from the source), gives increasing electrode currents before and after the changeover, so that the trigger action is not also accompanied by limitation of current magnitudes on either side of the trigger regime. The next embodiment does not have either of these disadvantages.

Figure 7:
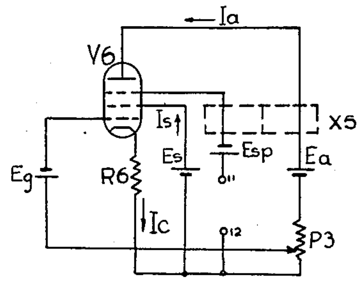

As was explained in connection with Fig. 5, it is only necessary to feed an appropriate in-phase voltage to either control electrode to secure the desired action. In Fig. 7 the circuit corresponds to Fig. 5, but with the additional resistance P3 now included in the anode lead and the fraction *q.P* included in the control grid in series with E*g*. If *q* be made zero, the action is entirely similar to Fig. 3, provided that when the anode current *k.Ic* flows the voltage drop on P3 does not cause the anode-cathode voltage to fall below about one-fifth of the screen-cathode voltage. As *q* is increased, and assuming control by means of E*sp*, then when anode current does flow, the fraction of anode current *q.P.k.Ic* causes the control grid to go negative, the voltage on R6 to fall, and the suppressor voltage to go more positive, thus accelerating the changeover. Again when *q.P* is made equal to R*s*, the action is cumulative without backlash; and when *q.P* is made greater than R*s*, the action is cumulative and has backlash of a calculable amount.

Figure 8:
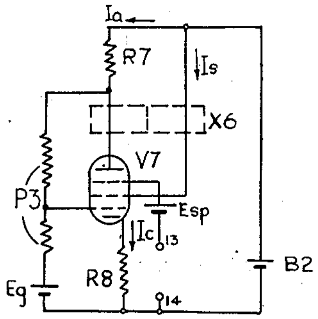

Fig. 8 shows a practical form of this circuit using only one supply battery B2. The fraction *q* of the change in voltage across R7 is taken by means of a high impedance potentiometer P3 while the suppressor and control grid voltages are shown as E*sp* and E*g*. It is now easy to arrange that R8 is much larger than the mutual resistance of the valve, because there is no added resistance in the screen lead upon which the trigger performance of the stage depends. Use may be made of the trigger action of the circuit, by means of a polarised relay such as X6, or by voltages on the resistance R7 or any suitable resistance in the screen lead; in connection with the latter any value can be used provided due allowance is made for the resulting mutual control grid resistance of the valve in stipulating the value of R8. Again the trigger action can be initiated by either E*sp* or E*g*, with opposing senses of action and the increment required on E*g* will be more than that on E*sp* due to the potentiometer, and in the ratio of $1:(1-q)$. Operation by means of E*sp* is now possible without taking current from the source, and furthermore gives the advantage that the current values for voltages on either side of the trigger value are constant. Some analysis of this circuit will now be made, in order to provide guidance in the use of the invention.

Consider I*a* to be zero, I*s* to be equal to Ic, and the circuit voltages to be such that the circuit is about to trigger. Then applying Fig. 2 we have the following:

$$I1.-Esp=\frac{2(B-I1.R)}{\mu}$$

whence, $$I1.R=\frac{2B+\mu.Esp}{\mu+2} \qquad (1)$$

where I1 is the cathode current prior to triggering, R is the value of R8 and B the voltage of the supply battery B2. From (1) it will be noticed that for positive values of E*sp*, *I1.R* must be at least equal to $2B/(\mu+2)$ and since $\mu$ is found to be of the order of 10, this makes *I1.R* at least one-fifth B. In order to sustain such a high fraction of the supply voltage on the cathode and secure normal values of cathode current, will mean that the grid-cathode drop will be an insignificant fraction of *I1.R* with modern valves and particularly those with high control grid amplification factors. Hence in general it is permissible to assume that *I1.R* equals the positive control grid input. From this we have, $$I1.R=q(B-Eg)+Eg \qquad (2)$$

which combined with (1) gives the trigger voltage as, $$Esp=\frac{(\mu+2)\,(q(B-Eg)+Eg)-2B}{\mu} \qquad (3)$$

from which it will be noted that E*sp* is independent of R, so that the initial cathode current can be altered over a wide range without affecting the trigger voltage.

Now consider the circuit to have been triggered, and the cathode current to have been reduced to I2, for an infinitesimal increment of E*sp*. Then the change in cathode voltage must have been brought about by the drop in voltage on R7 as received on the control grid via the potentiometer, i. e., $$I1.R-I2.8=q.k.I2.R7 \qquad (4)$$

or, $$I2=I1.\frac{R}{R+q.k.R7} \qquad (5)$$

If the circuit has been triggered the change of suppressor-cathode voltage must have been at least *v* (from Fig. 2); if it is more than *v*, by say E1, then E1 represents the backlash voltage on de-trigger, hence, $$\begin{aligned}E1&=q.k.R7.I2-v\\&=\frac{q.k.R7.R.I1}{R\ q.k.R8}-v\\&=\frac{q.k.R7}{R+q.k.R7}\left(\frac{2B+\mu,Esp}{\mu+2}\right)-v \qquad (6)\end{aligned}$$

Hence for a given circuit, Equations 1, 3, 5 and 6, define the working voltages and currents. For design purposes, B2, E*sp*, E*g*, E1, $v$, $\mu$, and either I1 or I2 will be given. If I1 is given, then R, the value of R8, is found from (1). I2 is found by combining (5) and (6) to get $$\frac{I2}{I1}=1-\frac{E1+v}{V} \qquad (7)$$

where $$V=\frac{2B+\mu.Esp}{\mu+2}$$

and R7 is obtained from (5) as follows, $$R7=\frac{R(I1-I2)}{q.k.I2} \qquad (8)$$

while $q$ is obtained from (1) and (2) as follows, $$q=\frac{V-Eg}{B-Eg} \qquad (9)$$

If I2 is given, then I1 is given by (7) and the rest follows similarly.

From (9) it will be noticed that, from a design point of view, positive values of E*g* only reduce the $q$ value, and therefore require a high value of R7. In general, therefore, and since negative values of E*g* would require an additional supply voltage, it is preferable to use zero control grid voltage.

As regards the voltage and current scope of the circuit, these are limited only by the usual valve limits. With regard to the onset of control grid current, this will only occur when I*a* is zero (since the control grid input is here a maximum). For a given class of valve, the minimum screen-cathode voltage can be found for onset of grid current at a particular cathode current I1. If this voltage be Vs, then B will have to be equal or greater than $Vs-I1.R$.

Anode voltage overloading can occur when the circuit is triggered, and again the screen cathode voltage (and hence B) must exceed $k.R7.I2$ by more than about 1.25 times. From this it can be shown that B must be equal or greater than $$\frac{1.25.v}{q(1-q)}$$

and assuming the lowest value for $q$ of $2/(\mu+2)$ from (9), together with a normal value of $v$ of 15 volts, this gives B equal or greater than 140 volts.

It will be seen therefore, that normal supply voltages can be used on the circuit, with normal values of current flow.

As regards the suppressor grid, this will not conduct for a considerable positive applied voltages, and if the backlash is reasonable and/or the applied input is not excessively positive, no trouble should be experienced. It should be noted that for the no backlash design, the suppressor is normally negative with respect to the cathode in both conditions of the circuit (see Fig. 2).

From (7) is will be noted that if the minimum change in the cathode current is required, then $E1+v$ must be small compared to V, and as $E1+v$ will be given, then V must be large, i. e. B or E*sp* must be large, and vice versa.

With regard to the currents available for operating a polarised relay as shown in the figures, there is I1 changing to $(1-k)I2$ in the screen lead and zero changing to $k.I2$ in the anode lead. If the screen winding have Ns turns the anode have N*a* turns, and the net operating ampere-turns before and after trigger be equated (in order to secure the same contact pressures), then, $$Ns.I1=Na.k.I2-Ns(1-k)I2$$

or $$\frac{Na}{Ns}=\frac{I1}{k.I2}+\frac{1-k}{k}=\frac{1}{k}\left(\frac{I1}{I2}+1\right)-1=$$

$$\frac{1}{k}\left(\frac{V}{V-(E1+v)}+1\right)-1=\frac{1}{k}\left(\frac{2V-(E1+v)}{V-(E1+v)}\right)-1\geqq\frac{2}{k}-1 \qquad (10)$$

Hence, $$\frac{Ns}{Na+Ns}\leqq\frac{k}{2}$$

or say, 0.35 to 0.475.

Thus, according to the normal anode-cathode current fraction $k$ of the valve, the total possible ampere-turns of the relay may be reduced to one third or one half. The latter figure is however usual, so that the circuit can operate the relay normally, although with poor $k$ values it may require 50% more current for the same pressures.

It will be understood that in all the foregoing embodiments of the invention, it will probably be necessary in practice to have semi-variable controls for taking up the differences in different valves and commercial tolerances. For instance the tapping on the potentiometer may be varied to obtain a given trigger voltage, while the values of R5 and R7 may be made slightly variable to obtain any given degree of backlash.

Figure 9:
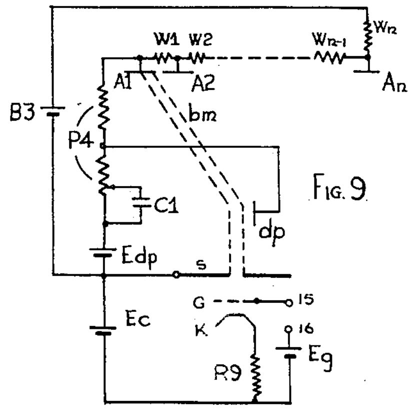
Figure 10:
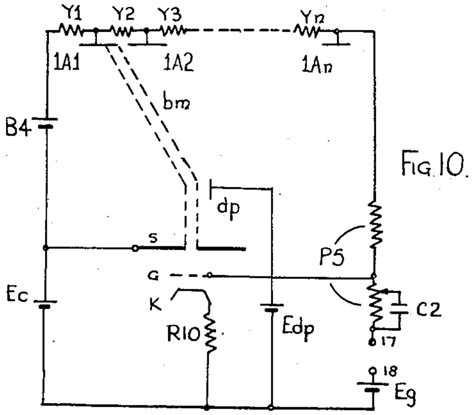

Figs. 9 and 10 show typical arrangements by which the invention may be applied to electron tubes having deflection means for registering an electron beam wholely or partly on subsidiary electrodes. K, G and S denote in outline the emissive cathode, the control grid for beam intensity, and the electron beam-forming electrode; the necessary supply potentials being E*g* and E*c*. The receiving anodes A1, A2, to A*n* are closely adjacent and of width at least sufficient to accommodate the electron beam *bm*. The main deflection plate is shown at *dp*, and the beam is shown deflected on to A1 by other means not shown, such as an additional plate or a magnetic field or by the mechanical construction of the tube. The supply B3 ensures a return path via the anode resistances W1, W2 to W*n* for the electrons forming the beam. The electron beam forming electrode S is the equivalent of the screen grid in the previous embodiments and the deflection plate is the equivalent of the suppressor grid since it is capable of modulating the anode current i. e. it controls the number of electrons arriving at any one anode.

In Fig. 9 the cathode resistance permits the application of a positive control voltage E*g* to the control grid, while potentiometer P6 applies the changes of anode voltage to *dp* with the aid of a bias E*dp*. Assuming that the beam is just on A1 as shown, then an initiating signal causing a decrease in E*g* will reduce the beam current, increase the potential of A1, increase the potential of *dp*, causing the beam to move to the right, which reduces the current received by A1 still further, so that provided the change fed back to *dp* is large enough, the beam "triggers" on to A2, where it will stop provided the resulting potential of A2 is sufficiently higher than was A1 to sustain the necessary additional positive voltage on *dp*. This can be arranged by properly grading the anode resistances W1, W2 and so on.

It will be understood that the speed with which the beam moves from the anode A1 to the anode A2 will depend on the degree of feedback and that the action may be prolonged until the beam is located wholly on the anode A2 by delaying the application of a portion of the feedback voltage by short-circuiting a portion of the potentiometer P4 by the condenser C1. The beam will now stop on the anode A2 but if the portion of the feedback voltage on C1 is made of still larger ultimate magnitude, then the beam will move slowly across A2 until it begins to leave A2 when the feedback circuit again becomes effective and the beam moves quickly from A2 to A3 and so on. The rapid movement from one anode to the next is given by the instantaneous feedback on the unshunted portion of the potentiometer P4 while the slow movement is given by the shunted portion. By these means, and ensuring that the successive potentials of the anodes are higher, the beam once having been triggered from A1 to A2, will continue to trigger from A2 to A3 and so on to A*n*. It may be stopped at any given anode by increasing the appropriate anode resistance, or otherwise ensuring that the anode voltage is only just sufficient to hold the beam in this position when the voltage on C1 attains its steady state value. The beam may be returned by increasing E*g*.

In the alternative form shown in Fig. 10, the cathode resistance R10 permits a positive control grid bias E*g* and transmits the voltage changes on the potentiometer P5 to the deflection plate *dp* via bias E*dp*. Assuming that the beam is just on 1A1 as shown, then an increase of E*dp* (or reduction of E*g*) will cause the beam to move slightly off 1A1 thus reducing the current to 1A1 and increasing the current to 1A2 thus reducing the potential applied to the potentiometer and that of the control grid via the potentiometer, causing the beam to move further to the right, which increases the current to 1A2 still further, so that provided the change fed back to *dp* is large enough, the beam triggers on to 1A2, where it will stop provided the resulting potential of 1A2 is sufficiently lower to sustain the required positive change on *dp*. This can be arranged by properly grading the anode resistances Y1, Y2 and so on. Again shunting a part of P5 (or, in this circuit, a part of R10) by a condenser such as C2 will enable the beam to move across 1A2 after it has triggered. By these means, and ensuring that the successive potentials of the anodes are lower, the beam once having been triggered from 1A1 to 1A2, will continue to trigger from 1A2 to 1A3 and so on to 1A*n*. It may be stopped at any given anode by decreasing the anode resistance, or otherwise ensuring that the anode voltage is only just sufficient to hold the beam in the required position when the voltage on C2 attains its steady state value. The beam may be returned by reducing E*dp* or increasing E*g*.

In both of these latter applications it is apparent that means have been provided for duplicating the actions of a step-by-step selecting switch as commonly used in automatic telephony; the transit of the beam from anode to anode is fast while the duration of the beam on each anode may be made as relatively slow as desired. The current pulses in the anode circuits are rectilinear with time and appropriate for the energisation of succeeding apparatus. By having rows of ten anodes each, in a plane at right angles to the figures, and providing additional deflection means for this direction of beam movement, the functions of a normal step-by-step switch may be obtained. The essence of this form of cathode ray tube switch is that the beam moves from anode to anode extremely quickly compared to its duration on the anodes, and that progressive movement in either direction can be made automatic.

The embodiments so far described have been mainly concerned with the application of the invention to a circuit which provides a trigger action. The invention is, however, by no means limited to this application and by arranging the circuit so that a trigger action is just not obtained, then an amplifier of high gain results. The gain may be adjusted at will, and the high frequency response is not limited to the same degree as in a normal amplifier, since high gain does not necessarily involve high output resistances but only a proper amount of feedback; furthermore, the high frequency gain drop due to electrode capacity may be reduced by over-equalisation of the potentiometer (i. e. an excess of shunt capacity across $1-q$ compared to that across $q$). In addition asymmetrical or symmetrical output voltages with respect to the supply busbars or a low impedance output with respect to the supply busbars may be obtained. The gain of the amplifier is substantially independent of busbar variations or of variations in the valve heater emission with life and the design of the circuit is independent of the normal curvilinear characteristics of the valve.

I claim:

1. In an electronic switching system, an electron discharge device of the beam deflection type comprising a cathode, a deflection plate and a plurality of anodes, a feedback circuit connected from said anodes to said deflection plate, a beam formed in said device and controlled by changes in the potential of said deflection plate to move from one anode to another, said beam being normally positioned on a certain one anode, means for initially changing the potential of said one certain anode to cause, by way of said feedback circuit, a change in the potential of said deflection plate to cause said beam to move from said one anode to the next, and means responsive to the movement of said beam from any one anode to the next anode for causing further changes, by way of said feedback circuit, in the potential of said deflection plate to cause said beam to move from each anode to the next succeeding anode.

2. An electronic switching system as claimed in claim 1 in which said means for initially changing the potential of said one anode is a grid in said discharge device which responds to a momentary change of grid potential to cause a change in beam current and a subsequent change in anode potential.

3. In an electronic switching system, an electron discharge device of the beam deflection type comprising a cathode, a deflection plate and a plurality of anodes in which a beam is formed extending from said cathode and controlled by the potentials of said deflection plate to move from one anode to and across another, a feedback circuit connected from said anodes to said deflection plate, means responsive to the movement of said beam from one anode to and across the next anode for causing, by way of said feedback circuit, the potential of said deflection plate to vary to cause said beam to move from each anode to and across the next, means in said feedback circuit for causing the potential of said deflection plate to vary in such a manner that the beam moves quickly from one anode to the next and slowly across each anode.

4. In an electronic switching system, an electron discharge device of the beam deflection type comprising a cathode, a deflection plate and a plurality of anodes comprising one anode and a group of other anodes, a beam formed in the tube and normally positioned on said one anode, a feedback circuit connected from said anodes to said deflecting plate, means for initially changing the potential of said one anode, said change in potential causing, by way of said feedback circuit, a change in the potential of said deflecting plate to cause said beam to be deflected from said one anode to the next anode, said next anode being the first one in said group of other anodes, and means associated with said anodes and responsive to the movement of said beam onto any one of said other anodes for causing said beam to automatically move from each of said other anodes to the next in succession.

5. An electronic switching system as claimed in claim 4 in which said last means is controllable to permit said beam to stop on any one of said other anodes.

6. In an electronic switching system, an electron discharge device of the beam deflection type comprising a cathode, a deflection plate and a plurality of anodes, a beam formed in the tube and normally positioned on one of said anodes, a feedback circuit connected from said anodes to said deflecting plate, means for initially changing the potential of said one anode, said change in potential causing, by way of said feedback circuit, a change in the potential of said deflecting plate to cause said beam to be deflected from said one anode to another anode, and means responsive to the movement of said beam onto said other anode for causing a further change in the potential of said deflecting plate to cause said beam to be deflected from said next anode to the remaining anodes in succession.

7. In an electronic switching system as claimed in claim 6, means for causing said beam to stop on one of said remaining anodes.

8. In an electronic switching system, an electron discharge device of the beam deflection type comprising a cathode, a deflection plate and a plurality of anodes, an anode circuit comprising a plurality of anode resistances, one resistance associated with each anode, one end of each anode resistance connected to its associated anode and the other end connected to the next anode, a beam formed in the tube and normally positioned on one of said anodes, a feedback circuit connected from said one anode to said deflecting plate, means for initially changing the potential of said one anode, said change in potential causing, by way of said feedback circuit, a change in the potential of said deflecting plate to cause said beam to be deflected from said one anode to another, and means including said anode resistances responsive to the movement of said beam onto said other anode for causing further changes in the potential of said deflecting plate to cause said beam to be deflected from said other anode to the next succeeding anodes.

9. In an electronic switching system, an electron discharge device of the beam deflection type comprising a cathode, a deflection plate and a plurality of anodes comprising one anode and a group of other anodes, an anode circuit comprising a plurality of anode resistances, one of said anode resistances associated with each of said anodes, said anodes and their associated anode resistances connected in series in said anode circuit, a beam formed in the tube and normally positioned on said one anode, a feedback circuit connected from said anode circuit to said deflection plate, means for initially changing the potential of said one anode, said change in potential causing, by way of said feedback circuit, a change in the potential of said deflection plate to cause said beam to be deflected from said one anode to the next anode, said next anode being the first one in said group of other anodes, said anode resistances causing changes in the anode circuit potential and thus subsequent changes in deflection plate potential each time the beam is moved to one of the anodes in said other group of anodes to thereby cause said beam to automatically and progressively move from each anode to the next in said other group of anodes.

10. An electronic switching system as claimed in claim 9 in which the values of said anode resistances are selectable so that the change in deflecting plate potential when the beam moves onto any certain selected one of said other anodes is such as to stop and hold the beam on said certain anode.

11. In an electronic switching system, an electronic discharge device of the beam deflection type comprising a cathode, a deflection plate and a plurality of anodes in which a beam is formed and normally positioned on one of said anodes, an anode circuit connecting said anodes in series, a feedback circuit connected from said anode circuit to said deflection plate, means for initially changing the potential of said one anode to cause, by way of said feedback circuit, a change in the potential of said deflection plate to thereby cause said beam to be deflected to a second anode, means in said anode circuit responsive to the movement of said beam to said second anode for causing a change in potential of said second anode to cause, by way of said feedback circuit, a further change in the potential of said deflection plate to thereby cause said beam to be deflected from said second anode to a third anode, and means in said anode circuit responsive to the movement of said beam to said third anode for retaining, by way of said feedback circuit, the potential on said deflection plate sufficient to stop and hold said beam on said third anode.

12. In an electronic switching system, an electron discharge device of the beam deflection type comprising a cathode, a deflection plate and a plurality of anodes, a beam formed in said tube and normally positioned on one of said anodes, a feedback circuit connected from said anodes to said deflecting plate, means for initially changing the potential of said one anode, means in said feedback circuit responsive to said initial change of potential on said first anode for causing said beam to quickly move from said one anode to the next anode, and means in said feedback circuit responsive to said initial change of potential on said first anode for causing said beam to move slowly across said second anode.

13. In an electronic switching system, an electron discharge device of the beam deflection type comprising a cathode, a deflection plate and a plurality of anodes, an anode circuit connecting together said anodes, a beam formed in said tube and normally positioned on one of said anodes, a feedback circuit connected from said anode circuit to said deflecting plate, means for causing an initial change in the potential of said one anode, said change in potential causing, by way of said feedback circuit, a change in the potential of said deflecting plate to cause the deflection of said beam from said one anode to the next and across said next anode, means in said anode circuit responsive to the movement of said beam to said next anode for causing a change in the potential of said next anode thus causing, by way of said feedback circuit, a further change in the potential of said deflecting plate to cause the deflection of said beam from said next anode to a third anode and across said third anode, means in said feedback circuit responsive to said changes in potential of said one anode and said next anode for causing said beam to move quickly from said one anode to said next anode and from said next anode to said third anode respectively, and means in said feedback circuit responsive to said changes in potential of said one anode and said next anode for causing said beam to move slowly across said next anode and said third anode respectively.

BERTRAM MORTON HADFIELD.

REFERENCES CITED

The following references are of record in the file of this patent:

UNITED STATES PATENTS

| Number | Name | Date |
|---|---|---|
| 2,010,253 | Barton | Aug. 6, 1935 |
| 2,057,773 | Finch | Oct. 20, 1936 |
| 2,060,095 | Mathes | Nov. 10, 1936 |
| 2,095,929 | Finch | Oct. 12, 1937 |
| 2,110,548 | Finch | Mar. 8, 1938 |
| 2,130,272 | Ford | Sept. 13, 1938 |
| 2,143,397 | White | Jan. 10, 1939 |
| 2,204,055 | Skellett | June 11, 1940 |
| 2,214,019 | Gray | Sept. 10, 1940 |
| 2,226,561 | Herold | Dec. 31, 1940 |
| 2,275,016 | Koch | Mar. 3, 1942 |
| 2,329,792 | Skellett | Sept. 21, 1943 |
| 2,332,977 | Skellett | Oct. 26, 1943 |
| 2,376,395 | Skellett | May 22, 1945 |
| 2,389,004 | Schroeder | Nov. 13, 1945 |
| 2,396,088 | Crosby | Mar. 5, 1946 |
| 2,404,919 | Overbeck | July 30, 1946 |
| 2,427,533 | Overbeck | Sept. 16, 1947 |
| 2,446,945 | Morton et al. | Aug. 10, 1948 |

FOREIGN PATENTS

| Number | Country | Date |
|---|---|---|
| 448,021 | Great Britain | Feb. 27, 1935 |
| 654,354 | France | Apr. 5, 1949 |

OTHER REFERENCES

Review of Scientific Instruments, July 1938, "New Vacuum Tube Counting Circuits," by Reich, pp. 222, 223.

Electronics, August 1939, "Trigger Circuits," by Reich, pp. 14–17.